(12) United States Patent
Ozaki et al.

(10) Patent No.: US 7,985,372 B2
(45) Date of Patent: *Jul. 26, 2011

(54) FERRITIC STAINLESS STEEL SHEET FOR USE IN RAW MATERIAL PIPE FOR FORMING BELLOWS PIPE

(75) Inventors: Yoshihiro Ozaki, Chiba (JP); Yasushi Kato, Chiba (JP); Takaaki Iguchi, Chiba (JP)

(73) Assignee: JFE Steel Corporation (JP)

(*) Notice: Subject to any disclaimer, the term of this patent is extended or adjusted under 35 U.S.C. 154(b) by 389 days.

This patent is subject to a terminal disclaimer.

(21) Appl. No.: 11/919,083

(22) PCT Filed: May 29, 2006

(86) PCT No.: PCT/JP2006/311156
§ 371 (c)(1),
(2), (4) Date: Oct. 23, 2007

(87) PCT Pub. No.: WO2006/132163
PCT Pub. Date: Dec. 14, 2006

(65) Prior Publication Data
US 2009/0068490 A1 Mar. 12, 2009

(30) Foreign Application Priority Data

Jun. 9, 2005 (JP) .................. 2005-169523
Jun. 9, 2005 (JP) .................. 2005-169524
Jun. 9, 2005 (JP) .................. 2005-169525

(51) Int. Cl.
*C22C 38/28* (2006.01)
*C22C 38/26* (2006.01)

(52) U.S. Cl. ............... 420/70; 420/60; 420/61; 420/68; 420/69; 148/325; 148/909

(58) Field of Classification Search .............. 148/325, 148/909, 590, 592, 593; 420/60, 61, 67–70
See application file for complete search history.

(56) References Cited

U.S. PATENT DOCUMENTS 3,277,149 A * 10/1966 Brickner et al. ............ 148/606
4,812,176 A * 3/1989 Tanaka et al. ............... 148/597
(Continued)

FOREIGN PATENT DOCUMENTS
JP 7-268560 A 10/1995
(Continued)

OTHER PUBLICATIONS

Machine-English translation of Japanese patent 09-125208, Takada Takeshi et al., May 13, 1997.*
(Continued)

*Primary Examiner* — Deborah Yee
(74) *Attorney, Agent, or Firm* — DLA Piper LLP (US)

(57) ABSTRACT

A ferritic stainless steel sheet for use in raw material pipes for forming bellows pipes has excellent formability. More specifically, the ferritic stainless steel sheet contains 10 % to 25 % by mass of Cr and has a yield stress in the range of 300 to 450 MPa and the product of the yield stress and the uniform elongation properties of at least 5200 (MPa·%). Preferably, the ferritic stainless steel sheet for use in raw material pipes for forming bellows pipes has an average crystal grain size D of 35 μm or less or a surface roughness of 0.40 μm or less as determined by Ra.

11 Claims, 3 Drawing Sheets

U.S. PATENT DOCUMENTS

| | | | |
|---|---|---|---|
| 5,806,899 A * | 9/1998 | Norikawa et al. | 285/299 |
| 5,843,246 A * | 12/1998 | Kim et al. | 148/607 |
| 6,911,098 B2 * | 6/2005 | Yazawa et al. | 148/325 |
| 7,819,991 B2 * | 10/2010 | Kato et al. | 148/325 |

FOREIGN PATENT DOCUMENTS

| | | |
|---|---|---|
| JP | 8-176750 A | 7/1996 |
| JP | 8-188854 A | 7/1996 |
| JP | 9-125208 A | 5/1997 |
| JP | 2001-262234 A | 9/2001 |
| JP | 2002-212683 A | 7/2002 |

OTHER PUBLICATIONS

Ukita, "Berouzu oyobi hurckisiburukan no saikin no seizou gijutu (Recent technique of manufacturing bellows and flexible pipes)", Sosei to kakou, Jul. 1991, 32,366, pp. 818-824. (Japanese article with 2 pages English Abstract).

* cited by examiner

US 7,985,372 B2

FERRITIC STAINLESS STEEL SHEET FOR USE IN RAW MATERIAL PIPE FOR FORMING BELLOWS PIPE

RELATED APPLICATION

This is a §371 of International Application No. PCT/JP2006/311156, with an international filing date of May 29, 2006 (WO 2006/132163 A1, published Dec. 14, 2006), which is based on Japanese Patent Application Nos. 2005-169523, filed Jun. 9, 2005, 2005-169524, filed Jun. 9, 2005, and 2005-169525, filed Jun. 9, 2005.

TECHNICAL FIELD

This disclosure relates to a ferritic stainless steel sheet for use in raw material pipes for forming bellows pipes that are installed in part of a transport pipeline of liquid or gas and that have a function of absorbing expansion and contraction strain or stress due to thermal expansion and mechanical vibrational strain.

BACKGROUND

Bellows pipes, or flexible tubing, (hereinafter referred to simply as "bellows") are formed using accordion steel pipes having parallel corrugated walls perpendicular to the axis of the pipes. Bellows can be elongated and contracted, be deflected, or be bent. Thus, bellows have been used in a wide variety of applications, including transportation means such as automobiles, ships, and aircraft, air conditioning, industrial plant equipment, and scientific experiment equipment such as vacuum equipment. In particular, bellows have recently been used as joints in automotive exhaust pipes and function to effectively absorb thermal strain due to high-temperature auto emission and the throb of an engine.

Metallic bellows and flexible tubing are processed by roll forming, hydraulic forming, elastomeric forming, expansion forming, and other various methods, as described in Ukita, "Berouzu oyobi hurekisiburukan no saikin no seizou gijutu (Recent technique of manufacturing bellows and flexible pipes)", Sosei to kakou, July 1991, 32, 366, pp. 818-824. An optimum processing method is selected according to the size and the application of bellows. FIG. 1 is a schematic view illustrating a hydraulic forming method in one-ridge-forming mode as a method for manufacturing an automotive exhaust bellows pipe. Reference numeral 1 denotes a raw material pipe for forming bellows pipes. After the raw material pipe is placed as illustrated in FIG. 1, the raw material pipe is filled with liquid, which is pressurized to expand the wall of the raw material pipe between a clamp die 3 and a forming die 4. Then, the clamp die 3 is compressed in the axial direction of the pipe to form a ridge 6. These procedures are repeated to manufacture a bellows having many ridges. Although the productivity is low, this method can save die cost as compared with a method of forming a predetermined number of ridges by hydraulic forming in one operation. Furthermore, the method illustrated in FIG. 1 can advantageously utilize a relatively simple die and form any number of ridges having any height, thus producing a bellows having a desired shape and a desired number of ridges.

Raw material pipes to be processed into bellows are generally single or duplex pipes of FCC metal (face centered cubic metal) such as copper or SUS 304 (austenitic stainless steel). The reason that the FCC metal or austenitic stainless steel sheets are used is that other metallic materials are difficult to process into bellows. Although raw material pipes made of the austenitic stainless steel sheets are easily processed into bellows, high-temperature or corrosive gas or liquid flowing through the bellows tends to cause oxidization, high-temperature corrosion, or stress corrosion cracks. In particular, the service temperature of austenitic stainless steel bellows for use in automotive exhaust systems is in the range of 500° C. to 750° C. Thus, the deposition of snow-melting salt sprinkled on roads tends to cause the sensitization of the material, thereby causing high-temperature salt corrosion. Furthermore, although the austenitic stainless steel is excellent in formability, it is expensive because of its high Ni content. Accordingly, there is a demand for an inexpensive material having excellent formability for use in raw material pipes for forming bellows pipes.

In such situations, various types of Ni-free ferritic stainless steel for use in raw material pipes for forming bellows pipes have been devised. For example, Japanese Unexamined Patent Application Publication No. 7-268560 discloses a ferritic stainless steel sheet that exhibits excellent bellows formability achieving the elongation of at least 35% and the r-value of at least 1.5 by specifying the contents of C, Si, Mn, S, Cr, Al, Ti, N, and O. Furthermore, Japanese Unexamined Patent Application Publication No. 8-176750 discloses a ferritic stainless steel sheet that exhibits excellent bellows formability by specifying the contents of C, Cr, Al, N, Si, Mn, Ti, Nb, Mo, Cu, and Ni and the optimum range of the crystal grain size. Furthermore, Japanese Unexamined Patent Application Publication No. 8-188854 discloses a ferritic stainless steel sheet that exhibits excellent bellows formability and excellent high-temperature fatigue properties by specifying the contents of C, Cr, Al, N, Si, Mn, Ti, Nb, Mo, Cu, and Ni. Furthermore, Japanese Unexamined Patent Application Publication No. 9-125208 discloses a ferritic stainless steel sheet that exhibits excellent bellows formability and resists to high-temperature salt corrosion by specifying the contents of C, Cr, N, Ti, and Mo and the optimum range of the surface roughness of a material.

However, the bellows formability of raw material pipes for forming bellows pipes made of the ferritic stainless steel sheets is still insufficient as compared with that of raw material pipes for forming bellows pipes made of austenitic stainless steel sheets. Thus, the ferritic stainless steel sheets are not applicable to bellows having a larger peak height H. The peak height H of a bellows pipe is half the difference between the outside diameter of peak $\Phi$ and the outside diameter of bottom A (the outside diameter of a raw material pipe for forming bellows pipes A) of the bellows pipe, as illustrated in FIG. 1. Furthermore, the present fact is that which characteristic of a ferritic stainless steel sheet used as a material of raw material pipes for forming bellows pipes has an effect on the formability of the raw material pipes for forming bellows pipes is poorly understood.

Accordingly, it could be advantageous to provide a ferritic stainless steel sheet exhibiting excellent bellows formability for use in raw material pipes for forming bellows pipes on the basis of the understanding of characteristics required for the ferritic stainless steel sheet as a material for raw material pipes for forming bellows pipes.

We investigated the relationship between the mechanical characteristics of a ferritic stainless steel sheet material and the formability of a raw material pipe for forming bellows pipes for the purpose of developing a raw material pipe for forming bellows pipes having excellent formability. As a result, we found that the formable maximum peak height Hmax (or the maximum outside diameter of peak $\Phi$MAX; hereinafter referred to simply as $\Phi$MAX) correlates with the yield stress YS of a material and with the produce (YS×UE1)

of the yield stress and the uniform elongation properties. We also found that the formable minimum peak height Hmin (or the minimum outside diameter of peak ΦMIN; hereinafter referred to simply as "ΦMIN") correlates with the yield stress YS of a material in bellows forming. We further found that the difference between the formable maximum peak height Hmax and the minimum peak height Hmin, that is, the formable peak height range (or half of (ΦMAX-ΦMIN)) correlates with the yield stress YS of a material and with the product (YS×UE1) of the yield stress and the uniform elongation properties.

The maximum outside diameter of peak ΦMAX and the minimum outside diameter of peak ΦMIN are determined as follows. Ten ridges were continuously formed by hydraulic forming in one-ridge-forming mode, as illustrated in FIG. 1, under the same conditions while the target value of the outside diameter of peak Φ was changed and the outside diameter of bottom A of a bellows pipe was kept constant (50 mm). Each outside diameter of peak of the 10 ridges was measured as $\phi(1)$, $\phi(2)$, $\phi(3)$, ..., and $\phi(10)$. The minimum value of them was designated as $\phi$min. The maximum value of them was designated as $\phi$max. The mean value of them was designated as $\phi$av. A bellows pipe satisfying the relation:

$$0.980\phi av \leq \phi min \leq \phi av \leq \phi max \leq 1.02\phi av$$

was considered as an accepted product. Among $\phi$avs of accepted products, the minimum $\phi$av was defined as the formable minimum outside diameter of peak ΦMIN. The maximum $\phi$av of an accepted product that had no crack during the hydraulic forming was defined as the formable maximum outside diameter of peak ΦMAX. The relation implies that variation in the outside diameter of peak Φ is small. In other words, the relation is indicative of forming stability. The relation is particularly effective in evaluating the formable minimum outside diameter of peak ΦMIN, around which the forming has a tendency to be unstable. On the other hand, the formable maximum outside diameter of peak ΦMAX generally depends on the occurrence of a crack in forming and is less affected by variation in the peak height H.

Thus, we provide a ferritic stainless steel sheet for use in raw material pipes for forming bellows pipes. The ferritic stainless steel sheet contains 10% to 25% by mass of Cr and has a yield stress in the range of 300 to 450 MPa and the product of the yield stress and the uniform elongation properties of at least 5200 (MPa·%).

Furthermore, the stainless steel sheet has a thickness of 0.5 mm or less and is to be used in single or duplex raw material pipes for forming bellows pipes for use in automotive exhaust systems. The outside diameter A of the raw material pipes for forming bellows pipes is in the range of 28 to 80 mm. The outside diameter A of the raw material pipes for forming bellows pipes is the outside diameter of steel pipes before the formation of the bellows pipes, as illustrated in FIG. 1. The outside diameter A of the raw material pipes is almost the same as the outside diameter of bottom A of the bellows pipes.

Furthermore, a stainless steel sheet is a ferritic stainless steel sheet for use in raw material pipes for forming bellows pipes having an average crystal grain size of 35 μm or less.

Furthermore, a stainless steel sheet is a ferritic stainless steel sheet for use in raw material pipes for forming bellows pipes having a surface roughness Ra of 0.40 μm or less. The surface roughness Ra is an arithmetical mean roughness measured in accordance with JIS B0601 (1997) in a direction perpendicular to the rolling direction of a steel sheet using a stylus surface roughness tester in conformity to JIS B0651.

Raw material pipes for forming bellows pipes formed of a ferritic stainless steel sheet are inexpensive and exhibit excellent formability. The raw material pipes are therefore suitably used as raw material pipes for forming bellows pipes for use in automotive exhaust systems.

Figure 1:
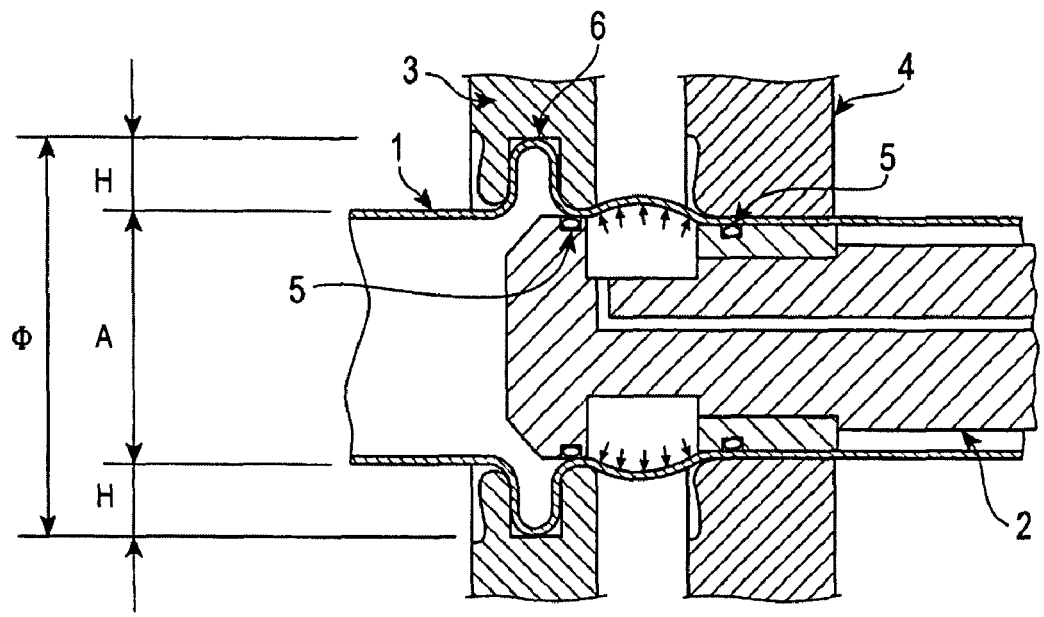
FIG. 1 is a schematic view illustrating a hydraulic forming method in one-ridge-forming mode.

| Reference Numerals | |
|---|---|
| 1 | raw material pipe for forming bellows pipe |
| 2 | rod |
| 3 | clamp die |
| 4 | forming die |
| 5 | seal packing |
| 6 | formed peak |
| Φ | outside diameter of peak |
| A | outside diameter of bottom (outside diameter of raw material pipe for forming bellows pipe) |
| H | peak height |

DETAILED DESCRIPTION

We investigated which characteristic of a ferritic stainless steel sheet used as a material of raw material pipes for forming bellows pipes has an effect on the formability using hydraulic forming in one-ridge-forming mode described above.

In manufacture of a bellows from a raw material pipe by hydraulic forming, the formable maximum peak height Hmax (or ΦMAX) generally depends on the occurrence of a crack in the wall of an evaginated raw material pipe. Thus, uniform elongation properties are important as the characteristics required for the material of a raw material pipe. This is because only one nonuniformity deformation in forming may cause a local thinning, thus acting as a source of cracks. Even if the nonuniformity deformation does not lead to a crack, the durability performance of the bellows deteriorates greatly. We carried out tensile tests of various ferritic stainless steel sheets and formed bellows from these ferritic stainless steel sheets by hydraulic forming. We investigated the relationship between the tensile properties and the formable maximum peak height Hmax (or ΦMAX) of the bellows. The results showed that the formable maximum peak height Hmax (or ΦMAX) somewhat correlates with the uniform elongation properties and strongly correlates with the yield stress YS as well as the product (YS×UE1) of the yield stress and the uniform elongation properties. The results also showed that the formable maximum peak height Hmax (or ΦMAX) increases when the YS is below a certain value and YS×UE1 is over a certain value. The results also showed that the formable maximum peak height Hmax (or ΦMAX) also strongly correlates with the average grain size D and further increases when the D is below a certain value. The results also showed that the formable maximum peak height Hmax (or ΦMAX) also strongly correlates with the surface roughness Ra and further increases when the Ra is below a certain value.

Figure 2:
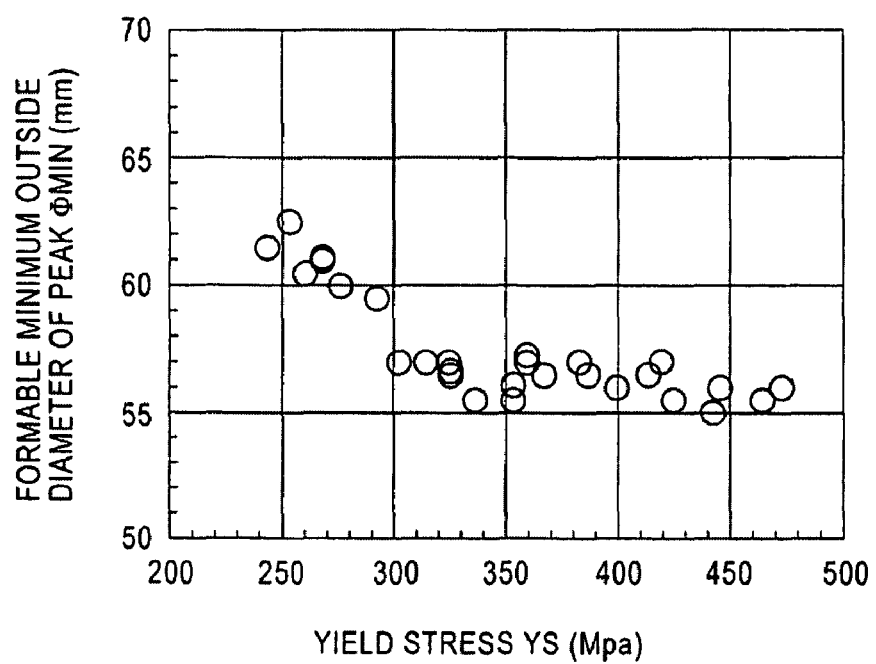
FIG. 2 is a graph illustrating the relationship between the yield stress YS and the formable minimum outside diameter of peak ΦMIN.

In manufacturing a bellows from a raw material pipe by hydraulic forming, the formable minimum peak height Hmin (or ΦMIN) depends on variation in the peak height H (or the outside diameter of peak Φ) under the same forming conditions. This is because although no crack occurs in a processing area where the peak height H (or the outside diameter of peak Φ) is small and therefore the processing strain is small, great variation in the peak height H (or the outside diameter of peak Φ) results in lack of a required quality. Thus, we investigated the relationship between variation in the peak height H (or the outside diameter of peak Φ) and the mechanical characteristics of a ferritic stainless steel sheet for use in a raw material pipe. The results showed that, as illustrated in FIG. 2 in Example 1 described below, variation in the peak height H (or the outside diameter of peak Φ) correlates with the yield stress of the raw material pipe; when the yield stress YS is over a predetermined value, variation in the peak height H (or the outside diameter of peak Φ) decreases and thus the formable minimum peak height Hmin (or ΦMIN) decreases.

The reason that the formable maximum peak height Hmax (or ΦMAX) increases when the yield stress YS of the material is below a certain value and the product (YS×UE1) of the yield stress and the uniform elongation properties is over a certain value can be considered as follows.

An excessively high YS results in a small n-value, leading to nonuniform propagation of processing strain. This results in poorer uniform elongation properties, thereby reducing the formable maximum peak height Hmax (or ΦMAX). Furthermore, bellows are formed by composite forming of stretch forming due to internal hydraulic pressure and buckling forming due to axial compression. Thus, large uniform elongation properties UE1 of a material are favorable for the stretch forming. Small yield stress of the material is favorable for the buckling forming. A material having small UE1 and small YS also generally has a small tensile strength (TS), which is the rupture strength of the material. The forming limit leading to rupture is therefore small. Consequently, it is believed that the formable maximum peak height Hmax (or ΦMAX) increases when the YS×UE1 is equal to or more than a certain value (5200 MPa·%).

The reason that the formable minimum peak height Hmin (or ΦMIN) decreases when the yield stress YS of a material is over a predetermined value is as follows. In general, a small YS means that plastic strain occurs easily. However, when a material is easy to deform and the deformation is small, a small YS makes the control of forming difficult, thereby causing variation in peak height H (or outside diameter of peak Φ). Particularly when a bellows is formed by hydraulic forming, a combination of two types forming: stretching forming by hydraulic pressure, and buckling forming by axial compression, as described above, further makes the control of forming difficult. Hence, it is believed that the YS is preferably somewhat large to reduce variation in peak height H (or outside diameter of peak Φ).

The yield stress YS of a material and the product (YS×UE1) of the yield stress and the uniform elongation properties are different characteristics. Thus, when a large formable maximum peak height Hmax (or ΦMAX) is desired, the YS may be decreased below a pre-determined value, and the YS×UE1 may be increased over a predetermined value. On the other hand, when a small formable minimum peak height Hmin (or ΦMIN) is desired, the YS may be increased over a predetermined value. Furthermore, to increase the process window of the formable peak height H (or the outside diameter of peak Φ), the maximum peak height Hmax (or ΦMAX) may be increased, and the minimum peak height Hmin (or ΦMIN) may be decreased. However, since a change in the maximum peak height Hmax (or ΦMAX) caused by the YS and the YS×UE1 is larger than a change in the minimum peak height Hmin (or ΦMIN) caused by the YS, it is effective to decrease the YS and increase the YS×UE1.

Furthermore, the reason that the formable maximum peak height Hmax (or ΦMAX) increases when the average crystal grain size D decreases below a certain value can be considered as follows. When the average crystal grain size D decreases, the number of crystal grains on a cross section of a steel sheet in the thickness direction increases and therefore the deformation strain propagates uniformly. In addition, an increase in strength due to a smaller average crystal grain size D reduces the occurrence of cracks. Thus, it is believed that these effects improve the uniform elongation properties and therefore increases the formable maximum peak height Hmax (or ΦMAX).

In general, a steel material contains an infinite number of crystal grains. Each individual crystal grain deforms anisotropically along a specific glide plane in a glide direction resulting from the crystal orientation. Thus, a macroscopic plastic strain is a result of total deformation of crystal grains having different crystal orientations. However, when crystal grains become large and the number of crystal grains on a cross section of a material in the thickness direction decreases, the effects of anisotropy of the crystal grains increase. Some crystal orientations may produce a portion at which a local constriction occurs easily. In a sheet or tubing material, such a portion can be a source of crack, thus causing degradation in formability. The formability of a bellows pipe, which often made of a thin-walled material, is therefore susceptible to the average grain size.

A further increase in formable maximum peak height Hmax (or ΦMAX) may be achieved by reducing the average grain size D below a predetermined value.

Furthermore, the reason that the formable maximum peak height Hmax (or ΦMAX) increases when the surface roughness Ra decreases below a certain value can be considered as follows.

A smaller surface roughness Ra results in a decrease in size of recessed and raised portions on the surface of a steel sheet, thereby reducing the number of sources of crack in processing. This may improve the uniform elongation properties and therefore increases the formable maximum peak height Hmax (or ΦMAX).

A further increase in formable maximum peak height Hmax (or ΦMAX) may be achieved by reducing the surface roughness Ra below a predetermined value.

The mechanical characteristics of a ferritic stainless steel sheet will now be described more specifically.

Yield stress YS: about 300-about 450 MPa

Figure 3:
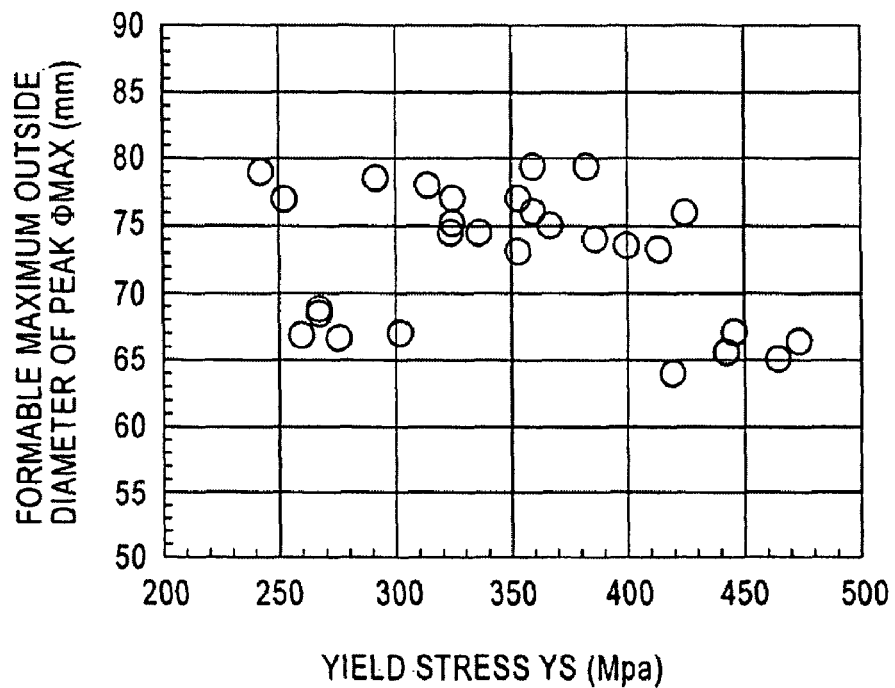
FIG. 3 is a graph illustrating the relationship between the yield stress YS and the formable maximum outside diameter of peak ΦMAX.

In general, the formability improves with decreasing yield stress YS of a material. However, in terms of the formability of a raw material pipe for forming bellows pipes, an excessively low YS is not preferred. This is because while a lower YS is indicative of easier deformation, as described above, the lower YS may cause variation in outside diameter of peak Φ (or peak height H) in hydraulic forming of a bellows. In particular, as illustrated in FIG. 2 in Example 1 described below, the yield stress YS below 300 MPa increases variation in outside diameter of peak Φ (or peak height H) and also tends to increase the formable minimum outside diameter of peak ΦMIN (or Hmin). As illustrated in FIG. 3 in Example 1 described below, the YS of a material over 450 MPa results in degradation in uniform elongation properties, thereby decreasing the formable maximum peak height ΦMAX (or Hmax). In addition, the YS of a material over 450 MPa results in an increase in strength of bellows and impairs the flexibility. This impairs the ability of the bellows to absorb displacement or vibration. Hence, the yield stress YS must be limited to the range of 300 to 450 MPa.

Product(YS×UE1)of yield stress and uniform elongation properties≧5200(MPa·%)

Figure 4:
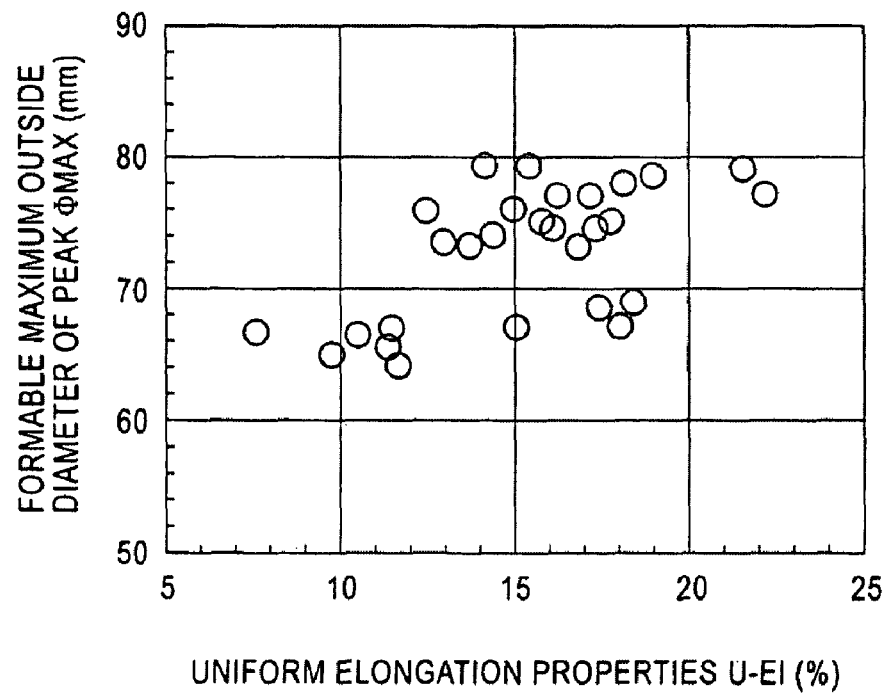
FIG. 4 is a graph illustrating the relationship between the uniform elongation properties UE1 and the formable maximum outside diameter of peak ΦMAX.
Figure 5:
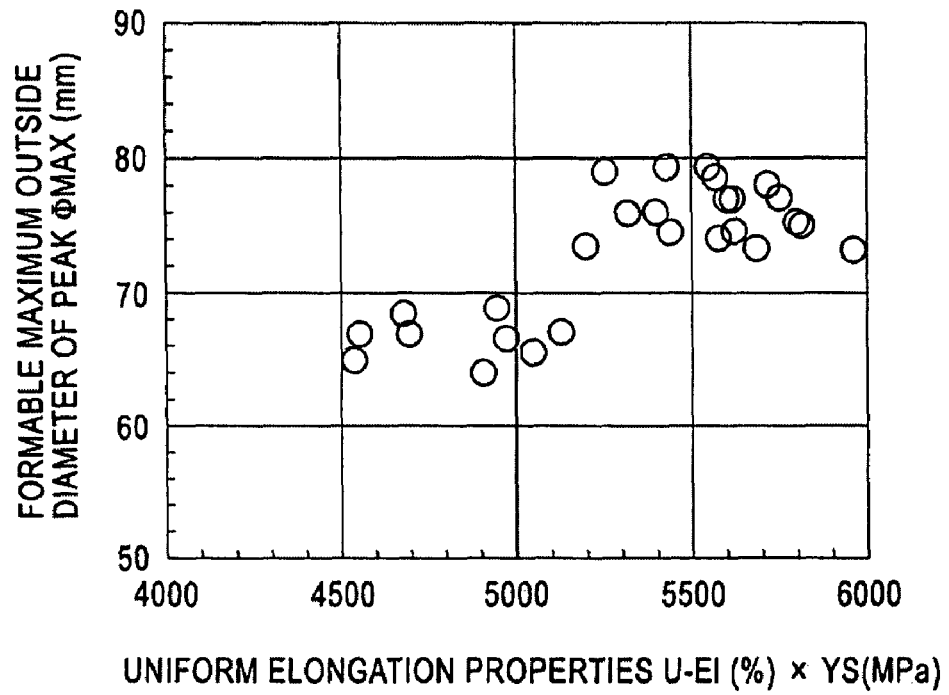
FIG. 5 is a graph illustrating the relationship between the product (YS×UE1) of the yield stress and the uniform elongation properties and the formable maximum outside diameter of peak ΦMAX.
Figure 6:
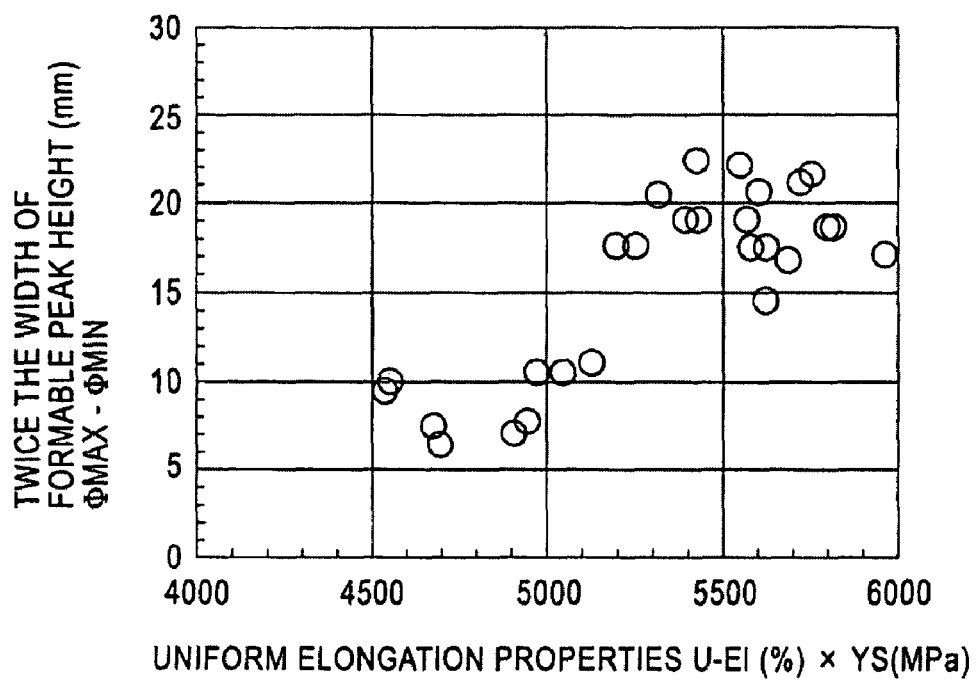
FIG. 6 is a graph illustrating the relationship between the product (YS×UE1) of the yield stress and the uniform elongation properties and ΦMAX-ΦMIN (twice the width of formable peak height H).

The formable maximum peak height Hmax (or ΦMAX), which is another factor of determining the bellows formability, that is, the maximum peak height at which bellows can be formed without causing a crack correlates loosely with the simple total elongation or the uniform elongation properties (FIG. 4 in Example 1 described below). As shown in FIG. 5 in Example 1 described below, the formable maximum peak height Hmax (or ΦMAX) depends strongly on the product (YS×UE1) of the yield stress and the uniform elongation properties. The formable maximum outside diameter of peak ΦMAX (or Hmax) increases with increasing product (YS×UE1). In particular, when the YS×UE1 of the material of a raw material pipe is 5200 (MPa·%) or more, the formable maximum peak height Hmax (or ΦMAX) increases greatly. Furthermore, the difference between the formable maximum peak height ΦMAX and the minimum peak height ΦMIN, that is, the range of the formable peak height H (or half of (ΦMAX-ΦMIN) tends to increase with increasing YS×UE1, as shown in FIG. 6 in Example 1 described below. Hence, the YS×UE1 must be at least 5200 (MPa·%).

Average crystal grain size D: about 35 μm or less

In addition to the product (YS×UE1) of the yield stress and the uniform elongation properties of at least 5200 (MPa·%), the formable maximum peak height Hmax (or ΦMAX), which is another factor of determining the bellows formability, that is, the maximum peak height at which bellows can be formed without causing a crack also depends strongly on the average crystal grain size D of a material steel sheet. The formable maximum outside diameter of peak ΦMAX (or Hmax) further increases with decreasing average grain size. In particular, a material having an average crystal grain size D of 35 μm or less exhibits improved uniform elongation properties. This reduces the occurrence of a crack, thereby increasing the formable maximum peak height Hmax (or ΦMAX) greatly. Furthermore, the difference between the formable maximum peak height ΦMAX and the minimum peak height ΦMIN, that is, the range of the formable peak height H (or half of ΦMAX-ΦMIN) tends to increase with decreasing average crystal grain size D. Hence, the average crystal grain size D must be 35 μm or less. Furthermore, the average crystal grain size D is preferably in the range of 10 to 25 μm to extend the boundaries of formable dimensions.

Surface roughness Ra: about 0.40 μm or less

In addition to the product (YS×UE1) of the yield stress and the uniform elongation properties of at least 5200 (MPa·%), the formable maximum peak height Hmax (or ΦMAX), which is another factor of determining the bellows formability, that is, the maximum peak height at which bellows can be formed without causing a crack also depends strongly on the surface roughness Ra of a material steel sheet. The formable maximum outside diameter of peak (or Hmax) further increases with decreasing surface roughness Ra. In particular, when the surface roughness of a material is 0.40 μm or less as determined by the arithmetical mean roughness Ra, the uniform elongation properties is improved. This reduces the occurrence of a crack, thereby increasing the formable maximum peak height Hmax (or ΦMAX) greatly. Furthermore, the difference between the formable maximum peak height Hmax and the minimum peak height Hmin, that is, the range of the formable peak height Hmax-Hmin (or half of ΦMAX-ΦMIN) tends to increase with decreasing surface roughness Ra. Hence, the surface roughness must be 0.40 μm or less as determined by the arithmetical mean roughness Ra. The surface roughness Ra is preferably 0.20 μm or less to extend the boundaries of formable dimensions or improve a product design such as a gloss.

A ferritic stainless steel sheet with the mechanical characteristics are preferably manufactured by the following method. A ferritic stainless steel having a preferred composition described below is melted into a steel slab. The steel slab is hot-rolled by a known method. The hot-rolled sheet is annealed if necessary, is pickled, is cold-rolled, and is finally annealed to yield an end product. Conditions for each process are not limited. However, in the hot rolling, a slab is heated preferably at a temperature in the range of 1000° C. to 1250° C. In rough rolling, the rolling temperature is preferably in the range of 1000° C. to 1150° C., and the reduction is preferably at least 60%. In finish rolling, the rolling temperature is preferably in the range of 600° C. to 900° C., the reduction is preferably at least 60%, and the coiling temperature is preferably in the range of 400° C. to 700° C. After hot rolling, the hot-rolled sheet is preferably subjected to continuous annealing at a temperature in the range of 800° C. to 1050° C. for at least 20 seconds or batch annealing at a temperature in the range of 700° C. to 850° C. for at least four hours. The annealed sheet is preferably pickled for descaling. The hot-rolled and annealed steel sheet obtained above is subjected to a cold rolling step to form a cold-rolling steel sheet.

In the cold rolling step, the total rolling reduction in the cold rolling step including one or two or more cold rolling operations is 50% or more. Two or more cold rolling operations include intermediate annealing. The cold-rolled steel sheet is subjected to final annealing. The final annealing is preferably performed by continuous annealing at a temperature in the range of 800° C. to 1050° C. for at least 10 seconds. If necessary, temper rolling at a reduction of at least 0.3% is performed to form a product sheet, that is, a steel sheet for use in a raw material pipe for forming bellows pipes.

To control the yield stress YS and the product (YS×UE1) of the yield stress and the uniform elongation properties within an appropriate range, in particular, the UE1 may preferably be increased by increasing the reduction in the final cold rolling and by final annealing at a relatively low temperature, or the YS may preferably be controlled by changing the reduction of the temper rolling in the final process, within the preferred manufacturing conditions described above. The YS and the YS×UE1 depend on not only the composition, but also the conditions of each manufacturing process starting from the hot rolling, the subsequent annealing, of a hot-rolled sheet, and the cold rolling leading to an end product. Thus, in industrial mass production, the conditions of each production line are preferably adjusted to optimum conditions.

Furthermore, to control the average grain size D within an appropriate range, in particular, the average crystal grain size D may preferably be decreased by increasing the reduction in the final cold rolling and by final annealing at a relatively low temperature, within the preferred manufacturing conditions described above. It is needless to say that the average crystal grain size D depends on not only the composition, but also the conditions of each manufacturing process starting from the hot rolling, the subsequent annealing of a hot-rolled sheet, and the cold rolling leading to an end product. Thus, in industrial mass production, the conditions of each production line are preferably adjusted to optimum conditions.

Furthermore, the arithmetical mean roughness Ra of the surface roughness of a steel sheet can be controlled by controlling the arithmetical mean roughness Ra of the surface roughness of a work roll in the temper rolling or, in the absence of temper rolling, by controlling the arithmetical mean roughness Ra of the surface roughness of a work roll in the final cold rolling. Furthermore, the temper rolling can control not only the surface roughness Ra, but also the YS by changing the reduction. Thus, the temper rolling is preferably combined with the cold rolling reduction and the final annealing temperature to control the YS and the surface roughness Ra. It is needless to say that mechanical characteristics such as the YS and the elongation depends on not only the composition, but also the conditions of each manufacturing process starting from the hot rolling, the subsequent annealing of a hot-rolled sheet, and the cold rolling leading to an end product. Thus, in industrial mass production, conditions of each production line are preferably adjusted to optimum conditions.

Preferably, a ferritic stainless steel sheet has a thickness of 0.5 mm or less. As described above, a bellows is formed in a parallel corrugated and accordion-pleated shape and has a function of absorbing displacement due to thermal expansion or vibration. The displacement is converted into bending stress on the bellows. A strain generated in the bellows increases with increasing thickness of the sheet. A strain beyond the elastic limit of the bellows becomes a plastic strain, which causes the fatigue fracture of the bellows pipe. Hence, the sheet preferably has a thickness as small as possible to prevent the fatigue fracture. However, in terms of the productivity or the manufacturing costs of a stainless steel sheet material or a stainless steel pipe material, the sheet preferably has a thickness of 0.5 mm or less without causing a substantial problem.

A cold-rolled and annealed sheet thus manufactured is bent and is subjected to a common arc welding process such as tungsten inert gas (TIG) or plasma welding to produce a raw material pipe for forming bellows pipes having an outside diameter A. The raw material pipe for forming bellows pipes is subjected to a hydraulic forming method to manufacture a bellows pipe having a predetermined outside diameter of peak Φ and the outside diameter of bottom A.

A raw material pipe for forming bellows pipes made of a ferritic stainless steel sheet is preferably a single or duplex pipe having an outside diameter A in the range of 28 to 80 mm. The amount of displacement absorbed by a bellows within an elastic limit depends mainly on the peak height. For the constant peak height H, as the outside diameter of a raw material pipe A (also referred to as the outside diameter of bottom A) decreases, the expansion ratio of a ridge increases. This makes forming difficult. In other words, the formable maximum peak height Hmax decreases. Thus, a small outside diameter of a raw material pipe A limits the amount of displacement to be absorbed. In automotive exhaust bellows, therefore, the outside diameter of a raw material pipe A is preferably at least 28 mm to absorb a certain amount of displacement. Furthermore, when a bellows has a large outside diameter of a raw material pipe A and a thin wall, the bellows has a tendency to collapse or buckle because of its insufficient rigidity and is therefore practically difficult to use. Hence, the outside diameter of a raw material pipe A is preferably 80 mm or less.

When the rigidity of a bellows pipe is required from the viewpoint of designing, the thickness t (thickness of sheet t) may be increased. However, as described above, an increase in the thickness t (thickness of sheet t) is not preferred because it is responsible for fatigue fracture. To avoid fatigue fracture, the rigidity or the strength can be maintained by laminating thin-walled steel sheets to form a multiplex pipe. More specifically, a duplex pipe is preferred. A triplex or more pipe is not preferred in terms of productivity or manufacturing costs. Furthermore, for the same thickness, a duplex pipe has lower rigidity and higher flexibility and therefore has a higher fatigue strength. Furthermore, in some operating environments, the inner surface and the outer surface of a bellows may have different characteristic requirements. In this case, a duplex pipe made of materials satisfying each characteristic requirement is preferred.

The composition of a ferritic stainless steel sheet will be described below.

Cr: about 10% to about 25% by mass.

Cr is an element essential to the corrosion resistance. A Cr content less than 10% by mass is insufficient to impart corrosion resistance to a stainless steel. On the other hand, a Cr content more than 25% by mass may cause deterioration in brittleness and reduced productivity. Because Cr is an expensive element, the Cr content is more preferably in the range of 10% to 18% by mass to reduce the raw material cost.

In addition to Cr, a ferritic stainless steel sheet may contain the following elements in a manner that depends on required characteristics to improve the corrosion resistance, the mechanical characteristics, or the chemical characteristics.

C: about 0.05% by mass or less, N: about 0.05% by mass or less

C and N form compounds with Cr, which cause deterioration in formability as well as corrosion resistance. C and N are therefore reduced as much as possible. Hence, the C content is preferably 0.05% by mass or less. The N content is preferably 0.05% by mass or less. More preferably, the C content is 0.01% by mass or less. More preferably, the N content is 0.01% by mass or less. Because an infinitesimal amount of C or N does not have an adverse effect on the characteristics of a bellows, there is no lower limit on the C content and the N content.

Si: about 0.2% to about 1% by mass

Si is an element that is effective in improving the resistance to oxidation or high-temperature salt damage. Si is also an element that hardens steel and reduces ductility. Preferably, 0.2% by mass of Si is added to improve the resistance to oxidation or high-temperature salt damage. However, over 1% by mass of Si results in excessive hardness and adversely affects the bellows formability. Hence, the upper limit of Si is preferably 1% by mass. 0.3% to 0.6% by mass of Si is more preferable.

Mn: about 0.5% by mass or less

Mn is an element added to improve deoxidization, desulfurization, and hot workability. At least 0.1% by mass of Mn is preferred to achieve these effects. However, because Mn sulfide causes deterioration in corrosion resistance, a smaller Mn content is preferred. Hence, in consideration of manufacturing costs and productivity, the Mn content is preferably 0.5% by mass or less. While the lower limit of Mn is not particularly specified, at least 0.2% by mass of Mn is preferred to decrease sensitivity to weld solidification cracking.

P: about 0.04% by mass or less

P segregates at a grain boundary and thus decreases the toughness. P is therefore preferably reduced. However, excessive dephosphorization results in an increase in manufacturing costs. Hence, the P content is preferably 0.04% by mass or less. More preferably, the P content is 0.03% by mass or less. Because a lower content of P does not adversely affect the advantageous effects, it is not necessary to specify the lower limit of the P content.

S: about 0.01% by mass or less

S is an element that has an adverse effect on the corrosion resistance or the oxidation resistance. In particular, the adverse effect is noticeable when the S content is over 0.01% by mass. Hence, the upper limit of S is preferably 0.01% by mass. More preferably, the upper limit of S is 0.007% by mass or less. Because a lower content of S does not have an adverse effect on the characteristics of a bellows, a lower S content is preferred.

Ni: about 1.0% by mass or less

Ni is an element that improves corrosion resistance. At least 0.1% by mass of Ni is preferred to achieve this effect. However, the effect levels off at 1.0% by mass. Thus, the addition of over 1.0% by mass of Ni only results in an increase in cost. Hence, the addition of 1.0% or less of Ni is preferred. 0.2% to 0.6% by mass of Ni is more preferred.

Ti: less than about 0.5% by mass, Nb: less than about 1.0% by mass

Ti and Nb react with C and N to form deposits and thus reduce the size of crystal grains, thereby improving the uniform elongation properties. Thus, Ti and Nb are optional elements. At least 0.02% by mass of Ti and/or at least 0.04% by mass of Nb is preferred to achieve these effects. However, the addition of excessive amounts of Ti and Nb results in deterioration in surface properties due to an increase in deposits, an increase in strength due to the formation of an intermetallic compound, and deterioration in formability due to the increased strength. Hence, the amounts of Ti and Nb to be added are preferably less than 0.5% by mass and less than 1.0% by mass, respectively. 0.05% to 0.4% by mass of Ti and 0.1% to 0.8% by mass of Nb are more preferred.

$$2Ti+Nb \geqq 16(C+N)$$

Furthermore, Ti and Nb immobilize C and N as deposits, improve the orientation of recrystallized grains in annealing after cold rolling, and improve the r-value. Ti and Nb is preferably added to satisfy $2Ti+Nb \geqq 16(C+N)$ to achieve these effects.

Mo: about 4.0% by mass or less, Cu: about 4.0% by mass or less

Both Mo and Cu improve corrosion resistance. At least 1.2% by mass of Mo and/or at least 1.2% by mass of Cu is preferred to achieve this effect. However, the addition of excessive amounts of Mo and Cu causes a surface flaw in a hot rolling process due to embrittlement, thus resulting in an end product having a poor surface quality. Hence, the amounts of Mo and Cu to be added are preferably limited to 4.0% by mass or less each. Mo in the range of 1.5% to 3.0% by mass and Cu in the range of 1.5% to 3.0% by mass are more preferred.

W: less than about 5.0% by mass

W increases strength and is effectively improves the fatigue durability at normal temperature and high temperatures required for bellows pipes. At least 0.5% by mass of W is preferred to achieve these effects. However, an excessive amount of W reduces ductility and thus adversely affects the formability. Hence, the upper limit of W is preferably less than 5.0% by mass. More preferably, the upper limit of W is 4.0% by mass or less.

EXAMPLES

Example 1

A ferritic stainless steel having a composition listed in Table 1 was melted into a steel slab. The steel slab was hot-rolled according to a routine procedure. The hot-rolled sheet was annealed, was pickled, was cold-rolled, was subjected to final annealing, and was temper-rolled to yield a temper-rolled sheet having a thickness of 0.3 mm. The manufacturing conditions in each process were within the preferred ranges described above. The mechanical characteristics were varied by changing the conditions of the annealing of the hot-rolled sheet, the final annealing, and the temper rolling. A sample was taken from the temper-rolled sheet. JIS 13B specimens were taken from the sample in a direction perpendicular to the rolling direction. A tensile test was performed in accordance with JIS Z 2241 to determine the yield stress YS and the uniform elongation properties UE1. Furthermore, a duplex pipe (thickness 0.6 mm) having an outside diameter of 50 mm was manufactured from the temper-rolled sheet. The duplex pipe was subjected to the following forming test as a raw material pipe for forming bellows pipes.

Bellows Forming Test

Ten ridges were continuously formed by hydraulic forming in one-ridge-forming mode, as illustrated in FIG. 1, under the same conditions while the target value of the outside diameter of peak Φ was changed and the outside diameter of bottom A of a bellows pipe was kept constant (50 mm). Ten outside diameters of peak of the 10 ridges were measured as φ(1), φ(2), φ(3), . . . , φ(10). The minimum value of them was designated as φmin. The maximum value of them was designated as φmax. The mean value of them was designated as φav. A bellows pipe satisfying the relation:

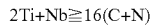

$$0.98\phi av \leqq \phi min \leqq \phi av \leqq \phi max \leqq 1.02\phi av$$

was considered as an accepted product. Among φavs of accepted products, the minimum φav was defined as the formable minimum outside diameter of peak ΦMIN. The maximum φav of an accepted product that had no crack during the hydraulic forming was defined as the formable maximum outside diameter of peak ΦMAX. The relation implies that variation in the outside diameter of peak Φ is small. In other words, the relation is indicative of forming stability. The relation is particularly effective in evaluating the formable minimum outside diameter of peak ΦMIN, around which the forming has a tendency to be unstable. On the other hand, the formable maximum outside diameter of peak ΦMAX generally depends on the occurrence of a crack in forming and is less affected by variation in the peak height H.

Table 2 shows the results of the tensile test and the bellows forming test. Furthermore, on the basis of the results shown in Table 2, FIG. 2 illustrates the relationship between the yield stress YS and the formable minimum outside diameter of peak ΦMIN, FIG. 3 illustrates the relationship between the yield stress YS and the formable maximum outside diameter of peak ΦMAX, FIG. 4 illustrates the relationship between the uniform elongation properties UE1 and the formable maximum outside diameter of peak ΦMAX, FIG. 5 illustrates the relationship between the product (YS×UE1) of the yield stress and the uniform elongation properties and the formable maximum outside diameter of peak ΦMAX, and FIG. 6 illustrates the relationship between the product (YS×UE1) of the yield stress and the uniform elongation properties and ΦMAX-ΦMIN (twice the width of formable peak height). These results show that the formable minimum outside diameter of peak ΦMIN is small and the formable maximum outside diameter of peak ΦMAX and ΦMAX-ΦMIN (twice the width of formable peak height) are large at a YS in the range of 300 to 450 MPa and a YS×UE1 of 5200 MPa·% or more.

Example 2

In steel 17 listed in Table 2 in Example 1, which was a working example, the product crystal grain size was varied by changing the temperature of annealing after cold rolling within the range of 800° C. to 860° C. and the annealing time within the range of 15 to 90 seconds. Table 3 shows the results of the bellows forming test of the resulting products. Table 3 shows that the formable maximum outside diameter of peak ΦMAX and ΦMAX-ΦMIN were increased and thus the bellows formability was further improved at a product crystal grain size D of 35 μm or less.

Example 3

In steel 10 listed in Table 2 in Example 1, which was a working example, the product surface roughness Ra was varied by changing the roughness of the temper rolling roll within the range of 0.3 to 0.6 μm. Table 4 shows the results of the bellows forming test of the resulting products. Table 4 shows that the formable maximum outside diameter of peak ΦMAX and ΦMAX-ΦMIN were increased and thus the bellows formability was further improved at a product roughness Ra of 0.4 μm or less.

INDUSTRIAL APPLICABILITY

A ferritic stainless steel sheet can also be used in applications that requires high-temperature properties, including heat exchangers and fuel cells.

TABLE 1

| Material No. | Components (mass %) | | | | | | | | | | | | | (2Ti + Nb) − 16(C + N) |
|---|---|---|---|---|---|---|---|---|---|---|---|---|---|---|
| | C | Si | Mn | P | S | Cr | Ni | Mn | N | Ti | Nb | Cu | W | |
| Steel 1 | 0.0100 | 0.018 | 0.005 | 0.0142 | 0.0022 | 9.6 | 0.20 | 0.001 | 0.0112 | 0.380 | 0.001 | 0.18 | — | 0.422 |
| Steel 2 | 0.0300 | 0.076 | 0.242 | 0.0142 | 0.0011 | 9.7 | 0.20 | 0.001 | 0.0120 | 0.380 | 0.109 | 0.10 | — | 0.197 |
| Steel 3 | 0.0213 | 0.045 | 0.010 | 0.0189 | 0.0016 | 11.0 | 0.50 | 0.001 | 0.0120 | 0.353 | 0.170 | 0.16 | — | 0.343 |
| Steel 4 | 0.0290 | 0.076 | 0.062 | 0.0261 | 0.0011 | 11.5 | 0.01 | 0.160 | 0.0164 | 0.370 | 0.109 | 0.08 | — | 0.123 |
| Steel 5 | 0.0123 | 0.101 | 0.462 | 0.0199 | 0.0005 | 11.6 | 0.60 | 0.160 | 0.0213 | 0.353 | 0.130 | 0.37 | — | 0.298 |
| Steel 6 | 0.0288 | 0.101 | 0.132 | 0.0310 | 0.0005 | 12.0 | 0.02 | 0.580 | 0.0213 | 0.447 | 0.234 | 0.41 | — | 0.326 |
| Steel 7 | 0.0260 | 0.140 | 0.192 | 0.0368 | 0.0008 | 12.1 | 0.52 | 1.100 | 0.0231 | 0.500 | 0.540 | 0.79 | — | 0.754 |
| Steel 8 | 0.0270 | 0.140 | 0.320 | 0.0368 | 0.0050 | 12.4 | 0.24 | 1.100 | 0.0320 | 0.166 | 0.923 | 1.02 | — | 0.311 |
| Steel 9 | 0.0084 | 0.189 | 0.280 | 0.0400 | 0.0003 | 13.3 | 0.01 | 1.540 | 0.0320 | 0.192 | 0.950 | 1.24 | — | 0.688 |
| steel 10 | 0.0182 | 0.244 | 0.382 | 0.0236 | 0.0005 | 13.4 | 0.65 | 1.950 | 0.0387 | 0.255 | 0.620 | 1.77 | — | 0.220 |
| Steel 11 | 0.0283 | 0.314 | 0.462 | 0.0270 | 0.0004 | 14.0 | 0.02 | 2.340 | 0.0031 | 0.368 | 0.675 | 2.49 | — | 0.909 |
| Steel 12 | 0.0830 | 0.434 | 0.247 | 0.0320 | 0.0054 | 15.5 | 0.73 | 0.840 | 0.0075 | 0.100 | 0.950 | 2.30 | — | −0.298 |
| Steel 13 | 0.1100 | 0.434 | 0.500 | 0.0312 | 0.0038 | 15.7 | 0.01 | 1.420 | 0.0107 | 0.100 | 0.923 | 3.59 | — | −0.808 |
| Steel 14 | 0.0250 | 0.210 | 0.380 | 0.0253 | 0.0039 | 16.1 | 0.45 | 0.120 | 0.0078 | 0.121 | 0.375 | 3.22 | — | 0.092 |
| Steel 15 | 0.0190 | 0.500 | 0.208 | 0.0378 | 0.0050 | 16.3 | 0.84 | 2.610 | 0.0111 | 0.166 | 1.000 | 4.00 | — | 0.850 |
| Steel 16 | 0.0100 | 0.231 | 0.172 | 0.0260 | 0.0029 | 17.2 | 0.67 | 1.950 | 0.0031 | 0.378 | 0.001 | 0.16 | — | 0.547 |
| Steel 17 | 0.0050 | 0.320 | 0.240 | 0.0284 | 0.0047 | 17.4 | 0.05 | 0.100 | 0.0442 | 0.387 | 0.016 | 1.47 | — | 0.003 |
| Steel 18 | 0.0052 | 0.329 | 0.240 | 0.0260 | 0.0050 | 17.5 | 0.01 | 0.100 | 0.0500 | 0.458 | 0.039 | 0.18 | — | 0.072 |
| Steel 19 | 0.0114 | 0.189 | 0.266 | 0.0390 | 0.0006 | 17.6 | 0.55 | 1.540 | 0.0387 | 0.085 | 0.410 | 0.50 | — | −0.222 |
| Steel 20 | 0.0059 | 0.347 | 0.260 | 0.0382 | 0.0043 | 17.7 | 0.89 | 0.120 | 0.0047 | 0.090 | 0.346 | 1.81 | — | 0.356 |
| Steel 21 | 0.0213 | 0.347 | 0.283 | 0.0247 | 0.0046 | 18.0 | 0.07 | 0.100 | 0.0047 | 0.457 | 0.011 | 2.18 | — | 0.509 |
| Steel 22 | 0.0125 | 0.231 | 0.300 | 0.0314 | 0.0022 | 18.4 | 0.91 | 0.840 | 0.0057 | 0.001 | 0.504 | 0.67 | — | 0.215 |
| Steel 23 | 0.0123 | 0.210 | 0.275 | 0.0230 | 0.0028 | 19.0 | 0.02 | 4.000 | 0.0075 | 0.010 | 0.410 | 1.26 | — | 0.113 |
| Steel 24 | 0.0114 | 0.270 | 0.330 | 0.0335 | 0.0030 | 20.0 | 0.79 | 3.500 | 0.0088 | 0.080 | 0.395 | 1.14 | — | 0.232 |
| Steel 25 | 0.0030 | 0.347 | 0.885 | 0.0256 | 0.0026 | 14.2 | 0.22 | 0.107 | 0.0046 | 0.457 | 0.011 | 0.11 | 2.44 | 0.803 |
| Steel 26 | 0.0125 | 0.231 | 1.108 | 0.0323 | 0.0042 | 14.6 | 0.18 | 0.846 | 0.0051 | 0.001 | 0.504 | 0.36 | 4.62 | 0.224 |
| Steel 27 | 0.0123 | 0.180 | 0.275 | 0.0246 | 0.0038 | 14.8 | 0.23 | 3.951 | 0.0072 | 0.010 | 0.410 | 0.04 | 3.13 | 0.118 |
| Steel 28 | 0.0114 | 0.270 | 0.330 | 0.0344 | 0.0022 | 15.4 | 0.20 | 1.790 | 0.0038 | 0.080 | 0.395 | 0.09 | 0.29 | 0.312 |

TABLE 2

| | Material properties of bellows raw material pipe | | | | | | |
|---|---|---|---|---|---|---|---|
| Material No. | YS (MPa) | Uel (%) | YS × UEL (MPa · %) | ΦMIN (mm) | ΦMAX (mm) | φMAX − φMIN (mm) | Remarks |
| Steel 1 | 464.9 | 9.8 | 4537 | 55.5 | 65.0 | 9.5 | Comparative Example |
| Steel 2 | 302.2 | 15.1 | 4554 | 57.0 | 67.0 | 10.0 | Comparative Example |
| Steel 3 | 473.8 | 10.5 | 4975 | 56.0 | 66.5 | 10.5 | Comparative Example |
| Steel 4 | 442.8 | 11.4 | 5048 | 55.0 | 65.5 | 10.5 | Comparative Example |
| Steel 5 | 314.4 | 18.2 | 5722 | 57.0 | 78.0 | 21.0 | Example |
| Steel 6 | 446.0 | 11.5 | 5129 | 56.0 | 67.0 | 11.0 | Comparative Example |
| Steel 7 | 420.0 | 11.7 | 4910 | 57.0 | 64.0 | 7.0 | Comparative Example |
| Steel 8 | 276.0 | 7.6 | 2100 | 60.0 | 66.7 | 6.7 | Comparative Example |
| Steel 9 | 425.6 | 12.5 | 5320 | 55.5 | 75.9 | 20.4 | Example |
| Steel 10 | 414.2 | 13.7 | 5687 | 56.5 | 73.2 | 16.7 | Example |
| Steel 11 | 387.2 | 14.4 | 5580 | 56.5 | 74.0 | 17.5 | Example |

TABLE 2-continued

Material properties of bellows raw material pipe

| Material No. | YS (MPa) | Uel (%) | YS × UEL (MPa · %) | ΦMIN (mm) | ΦMAX (mm) | φMAX − φMIN (mm) | Remarks |
|---|---|---|---|---|---|---|---|
| Steel 12 | 243.3 | 21.6 | 5255 | 61.5 | 79.0 | 17.5 | Comparative Example |
| Steel 13 | 336.5 | 16.2 | 5438 | 55.5 | 74.5 | 19.0 | Example |
| Steel 14 | 253.1 | 22.2 | 5624 | 62.5 | 77.0 | 14.5 | Comparative Example |
| Steel 15 | 324.3 | 17.4 | 5627 | 57.0 | 74.5 | 17.5 | Example |
| Steel 16 | 260.0 | 18.1 | 4698 | 60.5 | 66.9 | 6.4 | Comparative Example |
| Steel 17 | 400.0 | 13.0 | 5200 | 56.0 | 73.5 | 17.5 | Example |
| Steel 18 | 383.1 | 14.2 | 5432 | 57.0 | 79.3 | 22.3 | Example |
| Steel 19 | 292.4 | 19.1 | 5570 | 59.5 | 78.5 | 19.0 | Comparative Example |
| Steel 20 | 367.6 | 15.8 | 5815 | 56.5 | 75.0 | 18.5 | Example |
| Steel 21 | 267.8 | 17.5 | 4681 | 61.0 | 68.5 | 7.5 | Comparative Example |
| Steel 22 | 360.0 | 15.0 | 5400 | 57.0 | 76.0 | 19.0 | Example |
| Steel 23 | 353.7 | 16.3 | 5755 | 55.5 | 77.0 | 21.5 | Example |
| Steel 24 | 325.1 | 17.2 | 5605 | 56.5 | 77.0 | 20.5 | Example |
| Steel 25 | 267.8 | 18.5 | 4949 | 61.1 | 68.8 | 7.7 | Comparative Example |
| Steel 26 | 360.0 | 15.4 | 5551 | 57.3 | 79.3 | 22.0 | Example |
| Steel 27 | 353.7 | 16.9 | 5963 | 56.1 | 73.1 | 17.0 | Example |
| Steel 28 | 325.1 | 17.8 | 5800 | 56.7 | 75.2 | 18.6 | Example |

TABLE 3

Material properties of bellows raw material pipe

| Material No. | YS (MPa) | Uel (%) | YS × UEL (MPa · %) | ΦMIN (mm) | ΦMAX (mm) | φMAX − φMIN (mm) | D (μm) | Remarks |
|---|---|---|---|---|---|---|---|---|
| Steel 17-1 | 400.0 | 13.0 | 5200 | 56.0 | 73.5 | 17.5 | 41.2 | Example |
| Steel 17-2 | 403.7 | 12.9 | 5208 | 56.1 | 73.5 | 17.4 | 36.0 | Example |
| Steel 17-3 | 404.3 | 13.0 | 5256 | 56.4 | 76.6 | 20.2 | 34.2 | Example |
| Steel 17-4 | 403.2 | 13.4 | 5403 | 56.2 | 76.0 | 19.8 | 30.3 | Example (further improved) |
| Steel 17-5 | 406.8 | 12.8 | 5207 | 55.8 | 76.3 | 20.5 | 28.3 | Example (further improved) |

TABLE 4

Material properties of bellows raw material pipe

| Material No. | YS (MPa) | Uel (%) | YS × UEL (MPa · %) | ΦMIN (mm) | ΦMAX (mm) | φMAX − φMIN (mm) | Ra (μm) | Remarks |
|---|---|---|---|---|---|---|---|---|
| Steel 10-1 | 414.2 | 13.7 | 5675 | 56.5 | 73.2 | 16.7 | 0.584 | Example |
| Steel 10-2 | 413.6 | 13.7 | 5666 | 56.4 | 73.2 | 16.8 | 0.515 | Example |
| Steel 10-3 | 414.8 | 13.5 | 5600 | 56.4 | 73.2 | 16.8 | 0.421 | Example |
| Steel 10-4 | 412.3 | 13.9 | 5731 | 56.5 | 75.4 | 18.9 | 0.392 | Example (further improved) |
| Steel 10-5 | 412.0 | 14.0 | 5768 | 56.5 | 75.6 | 19.1 | 0.290 | Example (further improved) |

The invention claimed is:

1. A ferritic stainless steel sheet for use in raw material pipes for forming bellows pipes, comprising 0.05% by mass or less of C, about 10% to about 25% by mass of Cr, and at least one of 0.01% to 0.5% by mass of Ti and up to 0.5% by mass of Nb, wherein the ferritic stainless steel sheet has a yield stress in the range of about 300 to about 450 MPa, a uniform elongation of 12.5 to 18.2% and the product of the yield stress multiplied by the uniform elongation properties of at least about 5200 (MPa·%).

2. The ferritic stainless steel sheet according to claim 1, wherein the ferritic stainless steel sheet has a thickness of about 0.5 mm or less and forms single-phase or duplex-phase raw material pipes for forming bellows pipes for use in automotive exhaust systems, the raw material pipes for forming bellows pipes having an outside diameter in the range of about 28 to about 80 mm.

3. The ferritic stainless steel sheet according to claim 1, wherein the ferritic stainless steel sheet has an average crystal grain size of about 35 μm or less.

4. The ferritic stainless steel sheet according to claim 1, wherein the ferritic stainless steel sheet has a surface roughness of about 0.40 μm or less as determined by Ra.

5. A ferritic stainless steel sheet for use in raw material pipes for forming bellows pipes, comprising 0.05% by mass or less of C, about 10% to about 25% by mass of Cr, and at least one of 0.01% to 0.5% by mass of Ti and up to 0.5% by mass of Nb, wherein the ferritic stainless steel sheet has a yield stress in the range of about 300 to about 450 MPa, a uniform elongation of 12.5 to 18.2% and an average crystal grain size of about 35 μm or less.

6. The ferritic stainless steel sheet according to claim 5, wherein the ferritic stainless steel sheet has a thickness of about 0.5 mm or less and forms single-phase or duplex-phase raw material pipes for forming bellows pipes for use in automotive exhaust systems, the raw material pipes for forming bellows pipes having an outside diameter in the range of about 28 to about 80 mm.

7. A ferritic stainless steel sheet for use in raw material pipes for forming bellows pipes, comprising 0.05% by mass or less of C, about 10% to about 25% by mass of Cr, and at least one of 0.01% to 0.5% by mass of Ti and up to 0.5% by mass of Nb, wherein the ferritic stainless steel sheet has a yield stress in the range of about 300 to about 450 MPa, a uniform elongation of 12.5 to 18.2% and a surface roughness of about 0.40 μm or less as determined by Ra.

8. The ferritic stainless steel sheet according to claim 7, wherein the ferritic stainless steel sheet has a thickness of about 0.5 mm or less and forms single-phase or duplex-phase raw material pipes for forming bellows pipes for use in automotive exhaust systems, the raw material pipes for forming bellows pipes having an outside diameter in the range of about 28 to about 80 mm.

9. The ferritic stainless steel sheet according to claim 1, further comprising at least one of 0.09% to 4.0% by mass of Cu and 0.1% to 4.0% by mass of Mo.

10. The ferritic stainless steel sheet according to claim 5, further comprising at least one of 0.09% to 4.0% by mass of Cu and 0.1% to 4.0% by mass of Mo.

11. The ferritic stainless steel sheet according to claim 7, further comprising at least one of 0.09% to 4.0% by mass of Cu and 0.1% to 4.0% by mass of Mo.

* * * * *